Sept. 27, 1955     E. C. KIEKHAEFER     2,718,792

REVERSIBLE LOWER GEAR UNIT FOR OUTBOARD MOTORS

Filed Aug. 4, 1952     3 Sheets-Sheet 1

INVENTOR.
Elmer C. Kiekhaefer
BY
Andrus & Sceales
Attorneys

Sept. 27, 1955     E. C. KIEKHAEFER     2,718,792
REVERSIBLE LOWER GEAR UNIT FOR OUTBOARD MOTORS
Filed Aug. 4, 1952     3 Sheets-Sheet 2

INVENTOR.
Elmer C. Kiekhaefer
BY
Andrus & Sceales
Attorneys

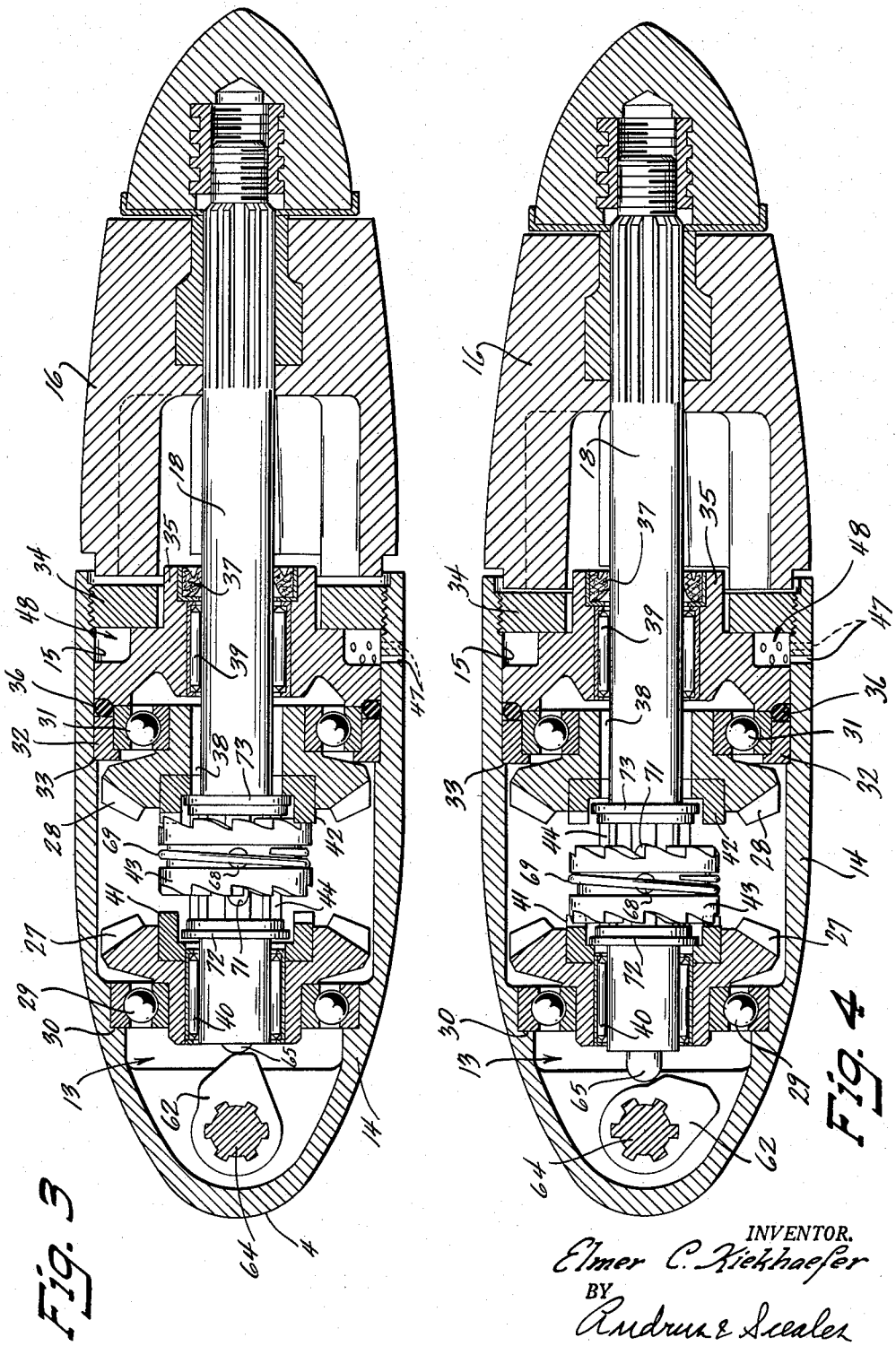

United States Patent Office 2,718,792
Patented Sept. 27, 1955

2,718,792
REVERSIBLE LOWER GEAR UNIT FOR OUTBOARD MOTORS
Elmer C. Kiekhaefer, Cedarburg, Wis.
Application August 4, 1952, Serial No. 302,482
6 Claims. (Cl. 74—378)

This invention relates to outboard motor lower gearshift units and particularly to improved means for supporting the propeller shaft.

The invention provides for the radial support of the propeller shaft substantially independently of the coaxially aligned driven gears and the selective and entire axial bearing support of the shaft by the particular gear driving the shaft and rotating therewith.

An object of the invention is to provide for the alignment of the gears of the outboard motor lower unit and the axial loading of the bearing supporting the gear driving the shaft.

Another object is to provide selectively for the axial support of the shaft in the direction of propeller thrust by the gear driving the shaft and propeller and to relieve of axial load the bearing supporting the gear not driving the shaft.

Another object is to allow the use of roller bearings for the radial support of the shaft independently of the driving gears and utilize the bearings supporting the driving gears for the axial support of the shaft.

Another object is to isolate the gears from deflection or bending of the shaft as with an unbalanced propeller or when the propeller strikes a submerged object.

Another object is to provide for the improved assembly of an outboard motor lower gear unit which includes a driving element shiftable to forward, neutral and reverse positions between oppositely rotating driven gears.

These and other objects and advantages of the invention will be more fully set forth in the following description of a preferred embodiment of the invention as illustrated in the accompanying drawings.

In the drawings:

Fig. 3 is an enlarged horizontal section taken axially of the propeller shaft and showing the shift element in reverse drive as in Fig. 2; and Fig. 4 is a view similar to Fig. 3 showing the gear shift unit in forward drive.

Figure 1:
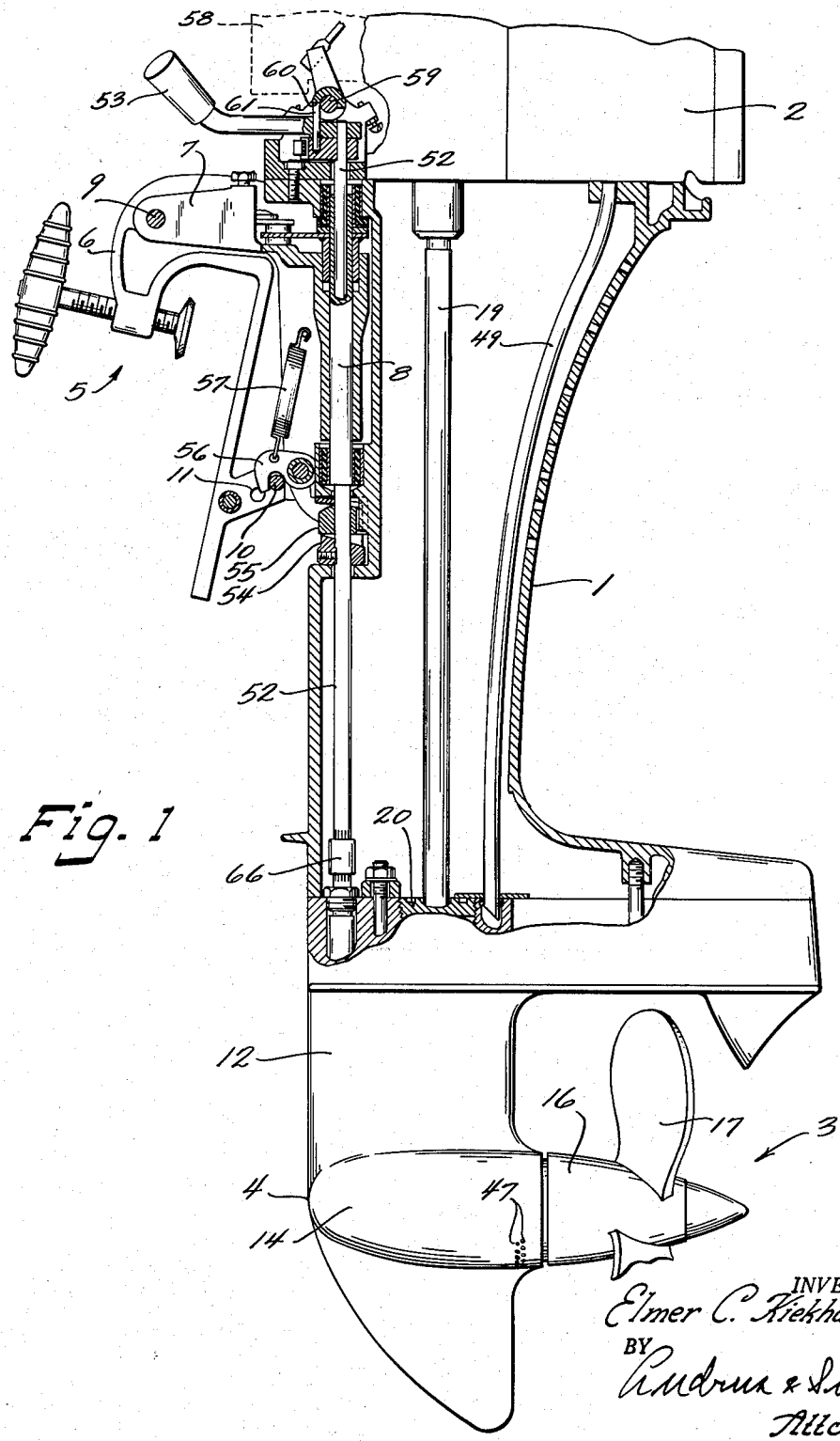
Fig. 1 is a side elevation of an outboard motor with the upper end thereof broken away and with other parts thereof including the drive shaft housing broken away and sectioned to show the construction thereof.
Figure 2:
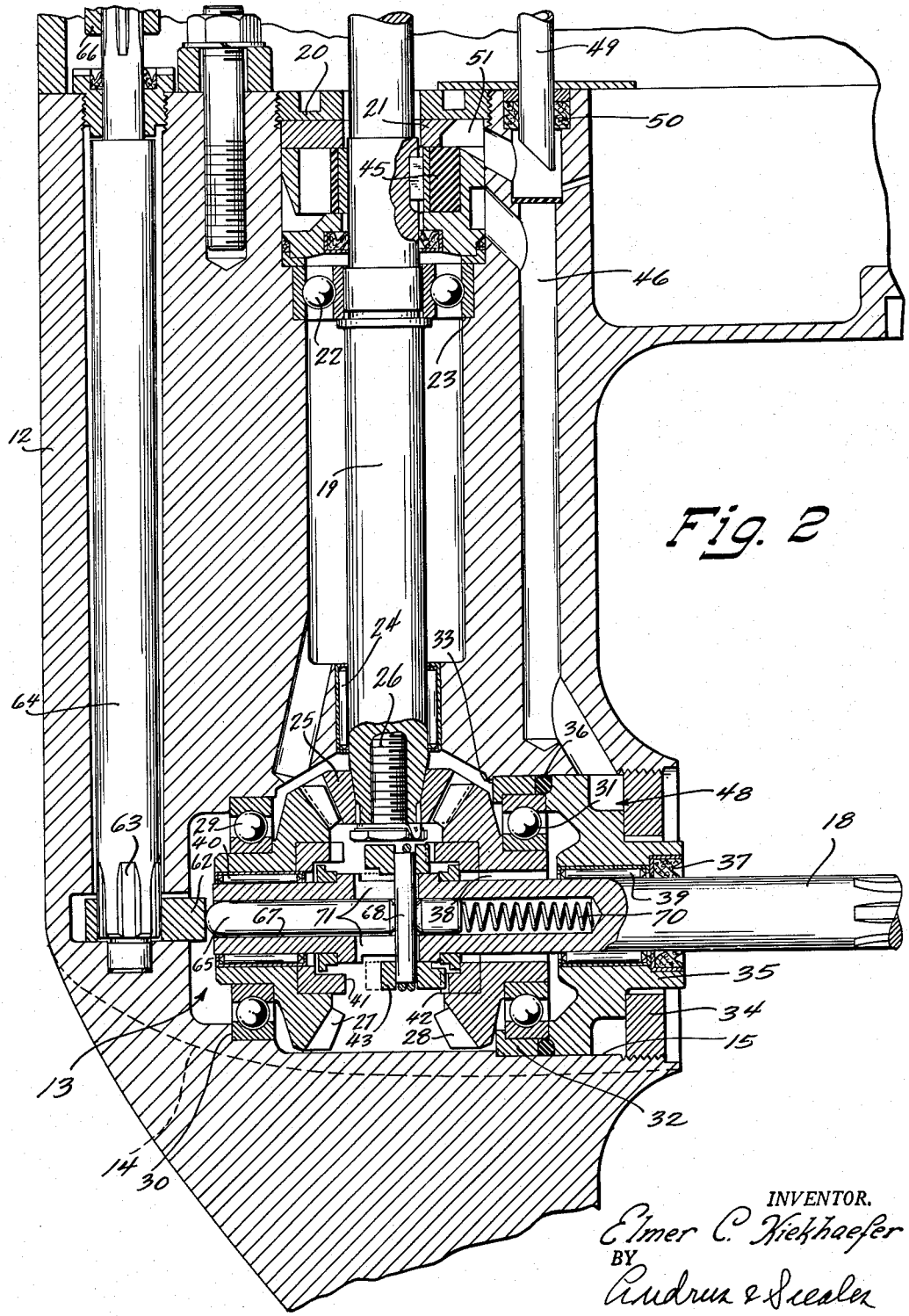
Fig. 2 is an enlarged longitudinal vertical section taken axially of the lower part of the outboard motor shown in Fig. 1 including the gear case.

The outboard motor shown in Fig. 1 includes the drive shaft housing 1 which supports at its upper end the engine 2, shown in part, and the lower propeller unit 3 which latter includes the gear case 4 secured to the lower end of housing 1. The bracket assembly 5 supporting the motor unit includes the clamp bracket 6 which is adapted to be secured to the transom of a boat, not shown, and the swivel bracket 7. The vertical sleeve 8 carried by bracket 7 pivotally supports drive shaft housing 1 and the motor unit for directional control or steering. The tilt pin 9 which extends transversely to connect brackets 6 and 7 provides for the tilting of the motor unit and bracket 7 on a transverse horizontal axis to allow raising of lower unit 3 and lifting of the same out of the water.

The pin 10 is adapted to be inserted selectively in one of the series of holes 11 in bracket 6 at the lower end thereof and provides for the selective tilt adjustment of the motor on pin 9.

Gear case 4 comprises a single, unitary cast member which includes the upper streamlined narrow strut 12 having a planiform top face. The gear chamber 13 is located within the enlarged torpedo section 14 of gear case 4 at the lower end of strut 12, and includes the bore 15 which opens rearwardly of section 14. The rear end of torpedo section 14 is truncated and the outline of the hub 16 of propeller 17 fairs the lines of section 14 to the rear end of the shaft 18 carrying propeller 17.

Shaft 18 and propeller 17 are driven by the vertical drive shaft 19 connected at its upper end in housing 1 to engine 2. The threaded disk 20 secures the cylindrical pump housing 21 and ball bearing unit 22 in the upper end of strut 12 of gear case 4 and against the annular shoulder 23 formed therein. Drive shaft 19 extends through disk 20, pump housing 21 and strut 12 into chamber 13. The ball bearing unit 22 supports drive shaft 19 rotationally and vertically, and the lower roller bearing unit 24 within gear case 4 immediately above chamber 13 rotationally supports the lower end of drive shaft 19. The beveled drive pinion 25 is secured on the splined lower end of drive shaft 19 by the bolt 26 within chamber 13 and meshes with the aligned forward and rear beveled driven gears 27 and 28 to drive the latter in opposite directions. The hub of the forward driven gear 27 is supported by the ball bearing unit 29 carried within the forward end of chamber 13 and seated against the rearwardly facing shoulder 30 therein. The ball bearing unit 31 carries the rear driven gear 28 and is supported by the flanged ring 32 which latter is seated against the annular shoulder 33 at the forward end of the bore 15 of chamber 13. The disc 34 is threaded within the rear end of bore 15 and secures the plate 35 therein and forwardly against the outer race of bearing unit 31. The outer ring seal 36 is compressed between ring 32 and plate 35 against bore 15 and the flanged seal 37 carried by plate 35 engages shaft 18 to close the rear end of chamber 13.

According to the invention, shaft 18 extends through the large central bore 38 of gear 28 and is rotationally supported independently thereof by the roller bearing unit 39 carried by plate 35 forwardly of seal 37. The roller bearing unit 40 within the hub of gear 27, and radially adjacent to bearing 29 supporting the latter, rotationally supports the forward end of shaft 18. The rotation of shaft 18 with either of gears 27 or 28 provides for the selective rotation of propeller 17 in a forward or reverse direction as desired and subject to the control of the operator.

Each gear 27 and 28 includes the clutch elements 41 annd 42, respectively, which are fitted within the adjacent faces of the gears and encircle shaft 18. Elements 41 and 42 are formed with clutch teeth facing the opposite element and selectively engageable with complementary clutch teeth formed in each end of the shiftable collar 43 mounted on shaft 18 between the gears. Collar 43 is internally splined to fit the splined section 44 of shaft 18 between gears 27 and 28 whereby the rotational engagement of collar 43 with clutch element 41 or 42 drives shaft 18 in the direction of rotation of the corresponding gear. The selective shifting of collar 43 to a "neutral" position on shaft 18 midway between elements 41 and 42 allows rotation of gears 27 and 28 and the operation of engine 2 without propulsion of the motor by propeller 17.

The pump impeller 45 is mounted on drive shaft 19 within housing 21 to operate at all times with the operation of engine 2 and irrespective of the rotation of shaft 18. The pump delivery passage 46 formed within the rear trailing edge of strut 12 of gear case 4 extends to housing 21 from bore 15 of chamber 13 between seal 36 and disk 34. The small inlet openings 47 in the underside of torpedo section 14 of gear case 4 open into the annular passageway 48 formed by plate 35 and disk 34 which extends around shaft 18 and communicates with the lower end of passage 46 to provide for the delivery of water to pump housing 21. The pipe 49 extending from engine 2 downwardly through housing 1 is carried at its lower end in the seal 50 and communicates with the outlet passage 51 from pump housing 21 to provide for the delivery of water from the pump to the engine.

The selective shifting of collar 43 by the motor operator is provided for by the shaft 52 which carries the lever 53 at the upper end thereof and extends downwardly through sleeve 8 and into the lower forward portion of drive shaft housing 1. Shaft 52 is rotatable by lever 53 to forward, neutral and reverse positions corresponding to the selective positions of collar 43, as will be described, and carries the cam 54 beneath swivel bracket 7 to move the collar 55 on shaft 52 and the latch 56 carried by bracket 7. Latch 56 is adapted to engage pin 10 when control shaft 52 is in the reverse position and to prevent the motor from tilting upwardly on pin 9. When control shaft 52 is in the neutral or forward position, collar 55 is lowered allowing the spring 57 to lift latch 56 and release the motor for tilting on pin 9.

Engine 2 includes the carburetor 58 and speed control shaft 59 which latter carries the rotatable abutment 61. The upright pin 61 carried at the upper end of shaft 52 and offset therefrom is disposed to be engaged by the speed control abutment 60 to limit the speed of the motor when control shaft 52 is in either the reverse or neutral position and to prevent overspeeds of engine 2 while the motor is in neutral and excessive boat speeds in reverse.

The coordinated shifting of collar 43 with rotation of shaft 52 is effected by the cam 62 mounted on the lower splined end 63 of the rod 64 and engageable with the forward end of the pin 65. Rod 64 is rotatably supported in the forward edge of strut 12 of gear case 4 and is connected at its upper end by the splined sleeve 66 with the lower end of shaft 52. Pin 65 is disposed within the central axial bore 67 of shaft 18 opening forwardly thereof and is connected at its rear end to collar 43 by the dowel-pin 68. Dowel-pin 68 extends through corresponding axial slots 71 in shaft 18 for movement of pin 65 and shift collar 43 and is retained by the wire 69 around the collar. Cam 62 is disposed within the forward end of chamber 13 with rod 64 to move pin 65 rearwardly against the spring 70 within bore 67 rearwardly of dowel-pin 68 whereby the manipulation of lever 53 effecting rotation of shaft 52, rod 64 and cam 62 shifts or allows spring 70 to urge collar 43 into selective engagement with clutch elements 41 and 42 of gears 27 and 28, respectively.

According further to the invention, the axial support of shaft 18 by bearings 29 and 31 selectively and in the corresponding direction of propeller thrust, is provided for by the rings 72 and 73 engageable with clutch elements 41 and 42 of gears 27 and 28, respectively driving shaft 18.

In the assembly of lower unit 3, cam 62 is first installed in the forward end of chamber 13 on rod 64. Bearing 29 and gear 27 with roller bearing 40 therein are installed thereafter with bearing 29 seated against shoulder 30. Pinion 25 is then secured on drive shaft 19 by bolt 26. The shift mechanism including collar 43, spring 70 and pin 65 is then assembled on shaft 18. With rings 72 and 73 mounted on shaft 18 as will be described, the shaft may be inserted in chamber 13 and the forward end of the shaft mounted in bearing 29. Gear 28 and bearing 31 with ring 32 are thereafter placed on shaft 18 and moved in bore 15 against shoulder 33. Ring seal 36 and plate 35 with bearing 39 and seal 37 are finally mounted on shaft 18 in bore 15 and secured by disc 34.

Rings 72 and 73 are mounted on shaft 18 at the forward and rear ends, respectively, of the splined section 44 of the shaft and in the assembled unit are disposed between gears 27 and 28. Clutch elements 41 and 42 have annular recesses immediate to shaft 18 which provide wear faces against which the corresponding ring is adapted to move with shaft 18. Only a minimum or nominal clearance between elements 41 and 42 and rings 72 and 73 should and needs to be provided and the clearance shown in the drawings, is exaggerated to show the axial movement of propeller 17 and shaft 18 in bearings 39 and 40 which takes place when the drive is changed to forward or reverse.

Propeller 17 is pitched for forward and reverse thrust with rotation of gears 27 and 28, respectively. The shifting of clutch collar 43 into engagement with rear clutch element 42 effects the rotation of shaft 18 with gear 28 and provides for the rearward propulsion of the motor. The rearward thrust of propeller 17, and shaft 18 is carried by ring 73 which moves into engagement with clutch element 42 of gear 28. Inasmuch as gear 28 and shaft 18 rotate in the same direction, there is no friction or wear between element 42 and ring 73 and the rearward thrust of the shaft is carried by bearing 31. The forward end of shaft 18 carried by roller bearing unit 40 rotates in the opposite direction of gear 27 during such limited periods of operation of the motor in reverse and at such reduced speeds as is maintained by the engagement of pin 60 and abutment 61 as described. The rotation of rod 64 and cam 62 to the neutral position allows the spring 70 within bore 69 to move pin 65 and collar 43 forwardly out of engagement with clutch element 42 and between clutch elements 41 and 42. At the same time, rotation of cam 63 and rod 64 with shaft 52 turns cam 54 to allow movement of latch 56 and the disengagement thereof with pin 10 so that the motor is free to tilt on pin 9. Rotation of rod 64 and cam 63 to the forward position allows the spring to move pin 65 forwardly and collar 43 into engagement with clutch element 41 whereby the rotation of shaft 18 is effected by forward gear 27. The forward thrust of shaft 18 allowed by rings 72 and 73 between elements with rotation of propeller 17 by gear 27, the forward thrust of the propeller moves shaft 18 axially in bearings 39 and 40 and moves ring 73 away from clutch element 42 and ring 72 into engagement with clutch element 41.

Bearing 29 supporting gear 27 carries the axial thrust of the propeller in the normal operation of the motor and roller bearing 40 supports the forward end of shaft 18 without rotation relative to gear 27. Gear 28 is supported by bearing 31 entirely independently of shaft 18 during normal forward operation of the motor and at high speeds. No friction losses between ring 72 and clutch element 41 are present because shaft 11 rotates with and is rotated by gear 27.

The invention is a continuation-in-part of the application of the present inventor, Serial No. 202,479 and filed December 23, 1950, for Reverse Gear for Outboard Motor Underwater Unit, and provides for the support of the propeller shaft entirely independently of the gear normally rotating in the reverse direction of the rotation of the shaft. The deflection of propeller 17, as in striking a submerged object which might cause bending of shaft 18 will not seriously affect gear 27 and the bearing 29 supporting the forward end of the shaft. Gear 28 and bearing 31 which are disposed between the radial support of shaft 18 are supported completely independently of shaft 18 and unaffected by any bending of shaft 18 as by deflection of propeller 17.

Various embodiments of the invention may be employed within the scope of the following claims:

I claim:

1. In a gear case unit for outboard motors having a gear chamber opening rearwardly thereof, a vertical drive-shaft having its lower end extending into said chamber, and a beveled pinion carried by the lower end of said drive-shaft; a beveled gear rotationally and axially supported within said chamber forwardly of said pinion and in mesh therewith, a second beveled gear mounted within said chamber rearwardly of said pinion and in mesh therewith and rotationally and axially supported within said chamber in axial alignment with said first named beveled gear to rotate in the opposite direction thereof, the hubs of said gears having clutch teeth in the adjacent faces thereof and aligned central axial bores, a propeller shaft radially supported at its forward end within the bore of said first named gear and extending through the bore of said second named gear and rearwardly of the unit, means including a member rotationally fixed with said shaft and shiftable between said gears to engage selectively the clutch teeth of one thereof and effect the rotation of said shaft with the last named corresponding driving gear and oppositely of the other idling gear, a propeller carried by said shaft rearwardly of the unit for propulsion in forward and reverse directions upon rotation of said shaft in a corresponding direction, bearing means within said chamber radially supporting said shaft rearwardly of said second named gear and independently thereof, said shaft being subject to the axial thrust of the propeller and having axially facing bearing means engageable with and spaced respecting said gears to allow limited relative axial movement of said shaft in response to propeller thrust in either direction, said axial bearing means being movable with said shaft respectively into engagement with either driving gear to carry the propeller thrust and out of engagement with the other idling gear rotating in the opposite direction.

2. The invenion as defined in claim 1 which includes a bearing within the bore of the forwardmost gear and radially supporting the propeller shaft at its forward end, and wherein the propeller is pitched for normal forward propulsion with rotation of said shaft by said forwardmost gear and the other gear is normally supported for idling entirely independently of said shaft.

3. The invention as defined in claim 1 wherein the axial bearing means and gears have engaging faces normal to the axis of rotation whereby the propeller thrust in either direction cooperates with the bearing support of the corresponding driving gear to secure the latter against the pitch-thrust of the beveled pinion.

4. The invention as defiend in claim 1 wherein the radial clearances between the shaft and the rearwardmost gear are sufficient to accommodate without interference substantial deflections of the shaft between the bearing supports thereof.

5. In a gear case unit for outboard motors having a gear chamber opening rearwardly thereof, a vertical drive-shaft having its lower end extending into said chamber, and a beveled pinion carried by the lower end of said drive-shaft; a beveled gear rotationally and axially supported within said chamber forwardly of said pinion and in mesh therewith, a second beveled gear mounted within said chamber rearwardly of said pinion and in mesh therewith and rotationally and axially supported within said chamber in axial alignment with said first named beveled gear to rotate in the opposite direction thereof, said gears having clutch teeth and aligned central axial bores, a propeller shaft radially supported at its forward end within said chamber and extending through the bore of said first named gear and through the bore of said second named gear and rearwardly of the unit, means including a member rotationally fixed with said shaft and shiftable between said gears to engage selectively the clutch teeth of one thereof and effect the rotation of said shaft with the last named corresponding driving gear and oppositely of the other idling gear, a propeller carried by said shaft rearwardly of the unit for propulsion in forward and reverse directions upon rotation of said shaft in a corresponding direction, bearing means within said chamber radially supporting said shaft rearwardly of said second named gear and independently thereof, said shaft being subject to the axial thrust of the propeller and having axially facing bearing means engageable with and spaced respecting said gears to allow limited relative axial movement of said shaft in response to propeller thrust in either direction, said axial bearing means being movable with said shaft respectively into engagement with either driving gear to carry the propeller thrust and out of engagement with the other idling gear rotating in the opposite direction.

6. The invention of claim 5 wherein said axial bearing means allows relative radial movement of the shaft respecting the corresponding gears and the radial clearances of the shaft within the gears allows deflection of the shaft without interference therebetween.

References Cited in the file of this patent

UNITED STATES PATENTS

| 1,181,634 | Bivert | May 2, 1916 |
| 1,184,944 | Gettelman | May 30, 1916 |
| 1,844,386 | Harris et al. | Feb. 9, 1932 |
| 2,071,634 | Irgens | Feb. 23, 1937 |
| 2,284,589 | Rippingille | May 26, 1942 |

FOREIGN PATENTS

| 123,237 | Great Britain | Feb. 20, 1919 |